United States Patent Office 2,955,801
Patented Oct. 11, 1960

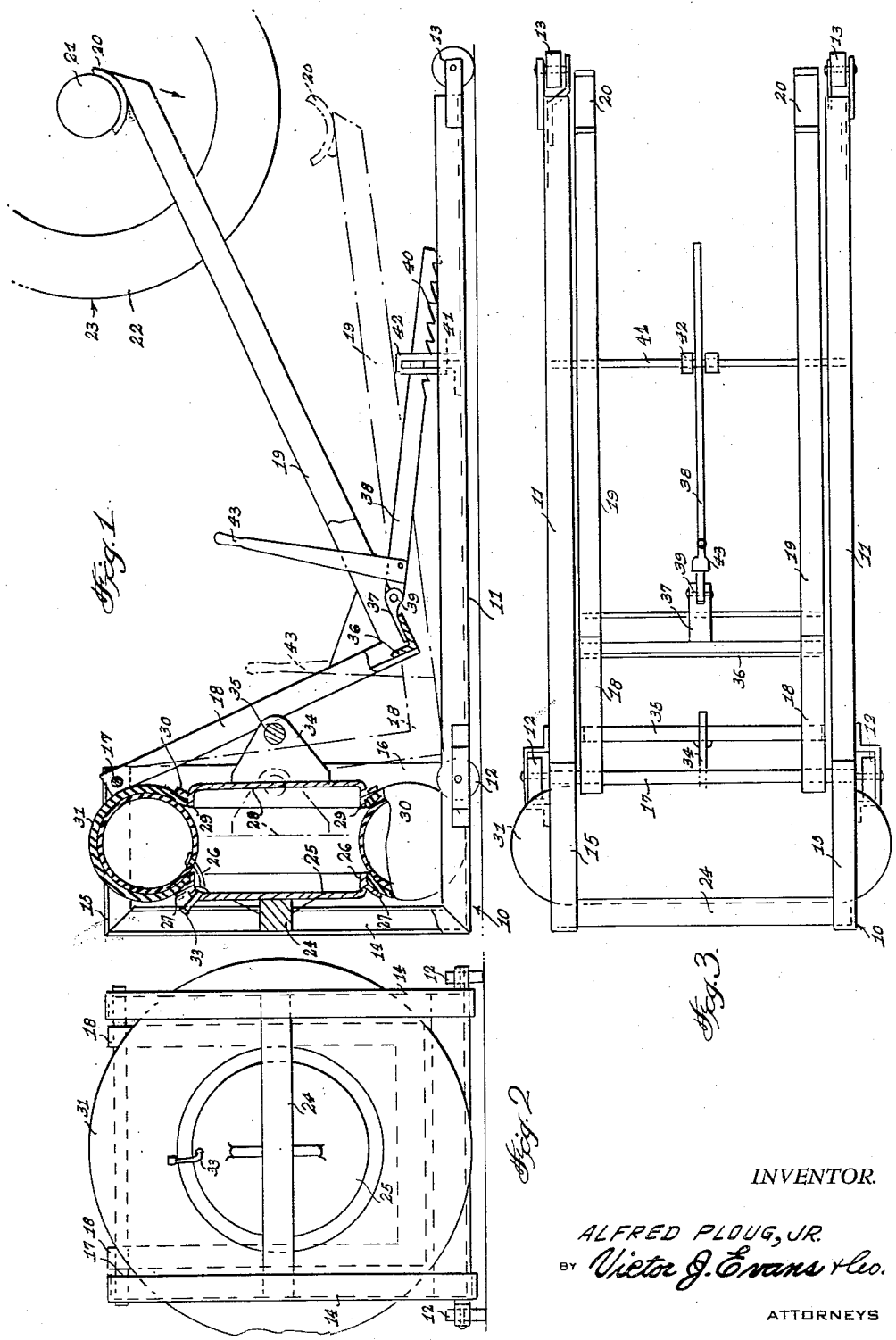

2,955,801

AIR JACK

Alfred Ploug, Jr., Kingsville, Tex.

Filed May 8, 1958, Ser. No. 733,878

1 Claim. (Cl. 254—2)

This invention relates to an air jack.

The object of the invention is to provide an air jack which is adapted to be used for lifting various objects or members such as portions of a vehicle being worked on, and wherein the jack of the present invention is adapted to be operated or actuated by means of air pressure.

Another object of the invention is to provide an air jack which includes a movable frame that is mounted on wheels so that it can be conveniently moved from place to place as desired, and wherein the jack is provided with an inflatable tube so that by supplying the tube with air under pressure, a pair of members can be raised so that with the members arranged in engagement with a portion of a vehicle such as the axle of a vehicle, the vehicle can be conveniently raised or lifted whereby a mechanic or other person can readily work on vehicles in any desired manner.

A further object of the invention is to provide an air jack which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the air jack of the present invention, with parts broken away and in section.

Figure 2 is an end elevational view of the air jack.

Figure 3 is a plan view of the air jack.

Referring in detail to the drawings, the air jack of the present invention is shown to comprise a frame which is indicated generally by the numeral 10, and the frame 10 includes a pair of horizontally disposed spaced parallel channel members 11. Wheels 12 and 13 are connected to the channel members 11 whereby the air jack can be readily rolled or moved from place to place as desired.

Extending upwardly from one end of each channel member 11 and secured thereto is a vertically disposed post 14, it being understood that there are two of the vertical posts 14, and these posts 14 are arranged in spaced parallel relation wtih respect to each other. The numeral 15 designates each of a pair of horizontally disposed spaced parallel support members, and the support members 15 are secured to the upper ends of the posts 14 in any suitably manner, as for example by welding. The numeral 16 indicates each of a pair of vertically disposed spaced parallel bars 16 which extend between the support members 15 and channel members 11, and the bars 16 are secured to these members in any suitable manner.

Extending between the pair of support members 15 is a horizontally disposed rod 17. The numeral 18 indicates a pair of movable spaced parallel arms, and the upper ends of the arms 18 are pivotally connected to the rod 17.

The air jack of the present invention further includes a pair of spaced parallel movable beams 19, and the beams 19 are secured as by welding to the lower ends of the arms 18. Each beam 19 has secured to its outer end an arcuate or curved saddle 20, and the pair of coacting saddles 20 are adapted to engage beneath the member being raised or lifted. For example as shown in Figure 1, the saddles 20 are shown engaging the lower surface of an axle 21 which may be connected to the wheels 22 of a vehicle 23 being raised or lifted.

Extending between the pair of posts 14 and secured thereto as by welding, is a horizontally disposed crosspiece 24. The numeral 25 indicates a circular stationary base which is secured as by welding to the crosspiece 24, and the base 25 is provided with a circular flange 26 and an upstanding circular lip 27. The numeral 28 indicates a movable plate, and the plate 28 is mounted for movement towards and away from the base 25, the plate 28 being provided with a circular flange 29 and an upstanding circular lip 30.

There is further provided a tire 31 which has an inflatable tube 32 arranged therein, and a valve assembly 33 is connected to the tube 32 whereby air under pressure can be supplied to the tube 32. Furthermore, the valve assembly 33 provides a means whereby air can be discharged from the tube 32.

Extending outwardly from the plate 28 and secured thereto is an ear 34, Figure 1. The numeral 35 indicates a horizontally disposed tie rod which is connected to the ear 34, and the tie rod 35 abuts the pair of movable arms 18.

The numeral 36 indicates an angle iron which is secured to the junction of said arms 18 and beams 19, and a lug 37 is secured as by welding to the angle iron 36. The numeral 38 indicates a rack which is pivotally connected to the lug 37 by means of a pivot pin 39. The rack 38 is provided with a plurality of teeth 40, and the teeth 40 are adapted to selectively engage a keeper 41, the keeper 41 extending between the channel members 11 and being secured thereto. Thus, the keeper 41 coacts with the teeth 40 to maintain the parts immobile in their adjusted positions. The rack 38 is mounted for sliding or adjustable movement through a guide member 42, and the guide member 42 helps maintain the rack 38 in its proper aligned position as it moves back and forth. The numeral 43 indicates a handle which is secured to the rack 38 so that when desired, the teeth 40 can be released from the keeper 41 as for example when the air jack is to be lowered.

From the foregoing, it is apparent that there has been provided an air jack which is capable of lifting heavy loads and wherein the air jack is especially suitable for use around garages or other localities where there is a convenient source of compressed air available. To use the air jack of the present invention, it is only necessary to move the device to the desired location, and the wheels 12 and 13 permit the jack to be readily rolled or pushed to its desired location so that the saddles 20 can be arranged beneath the member to be lifted. For example, the saddles 20 can be arranged beneath an axle such as the axle 21 of a vehicle 23 which is to be worked on. Then, with the parts such as the beams 19 and arms 18 in the lowered position as indicated by broken lines in Figure 1, and with the tube 32 deflated, it will be seen that the valve 33 can be connected to a suitable source of air under pressure whereby air under pressure can be supplied to the inflatable tube 32. When the parts are in lowered position, and when the tube 32 is deflated, it will be seen that the plate 28 will be in the position indicated by broken lines in Figure 1. Then, when air under pressure is introduced through the valve 33 into the tube 32, it will be seen that the tube 32 will expand and this expansion will cause the plate 28 to move away from the base 25 so that the plate 28 will move from the broken line position shown in Figure 1 to the solid line position shown in Figure 1. It is to be noted that when the tire 31 and tube 32 are in position on the device, the flanges 26 and 29 and the lips 27 and 30 engage the bead or inner portions of the tire so that the flanges and lips retain or maintain the tire and tube in their proper position on the device. It will be seen that as the plate 28 moves away from the base 25, the ear 34 is likewise moved since the ear 34 is secured as by welding to the movable plate 28. The ear 34 carries the tie rod 35 which abuts or engages the arms 18, so that this movement of the ear 34 causes the arms 18 to pivot on the rod 17. As the arms 18 pivot in a clockwise direction from the broken line position shown in Figure 1 to the solid line position shown in Figure 1, it will be seen that there will be a corresponding movement of the beams 19 from the broken line position shown in Figure 1 to the solid line position shown in Figure 1. Thus, with the saddles 20 secured to the beams 19, it will be seen that the saddles 20 will move upwardly to thereby lift the member which is to be raised. As the beams and arms move, they carry the angle iron 36 therewith, and since the rack 38 is pivotally connected to the lug 37, and since the lug 37 is secured to the angle iron 36, it will be seen that the teeth 40 of the rack 38 will engage the keeper 41 so that when air pressure on the valve 33 and tube 32 is arrested or stopped, the keeper 41 will engage the teeth 40 so as to prevent accidental lowering of the parts such as the beams 19. Then, when it is desired to release the air jack as for example when the load is to be moved downward, it is only necessary to grip the handle 43 whereby the rack 38 can then be pivoted on the pin 39 so that the teeth 40 can be moved out of engagement with the keeper 41 and this will permit the weight of the load such as the load 23 to return the parts to their lowered position.

The parts can be made of any suitable material and in different shapes or sizes.

Thus, it will be seen that there has been provided a jack which is operated by compressed air or air under pressure. It is to be understood that suitable braces may be used wherever desired or required. It will be seen that the jack of the present invention utilizes a novel type of power mechanism and the jack is highly versatile and adaptable to different types of mechanisms. It can be operated by means of a diaphragm or tube, and the flanges and lips act as safety devices so as to prevent the tire and tube from slipping off. The valve 33 extends through the stationary base 25.

The amount of air pressure required to operate the air jack may be 20 to 30 pounds on a passenger vehicle, and the reason for this small amount of air pressure is that the tire has approximately 500 square inches on each side thereof.

Minor changes in shape, size and rearrangement of details coming within the field of invention claimed may be resorted to in actual practice, if desired.

I claim:

In an air operated jack, a pair of spaced parallel horizontally disposed channel members, wheels connected to said channel members, a post extending upwardly from the corresponding end of each channel member and secured thereto, a pair of horizontally disposed support members extending forwardly from the upper ends of said posts and secured thereto, vertically disposed spaced parallel bars having their upper ends secured to said support members and their lower ends secured to said channel members, a rod extending between said pair of support members, a pair of spaced parallel arms having their upper ends pivotally connected to said rod, spaced parallel beams arranged at right angles to the lower ends of said arms and secured to said arms, saddles secured to the outer ends of said beams, a crosspiece extending between said posts and secured thereto, a vertically disposed base of circular formation secured to said crosspiece, said base including a circular flange and a circular lip, a movable circular plate mounted for movement towards and away from said base, said plate including a circular flange and a circular lip, a tire arranged in engagement with said lips and flanges, an inflatable tube arranged in said tire, a valve connected to said tube, an ear extending outwardly from said plate and secured thereto, a tie rod connected to said ear and abutting said arms, an angle iron secured to said arms and beams at the junction thereof, a lug secured to said angle iron, a rack pivotally connected to said lug and provided with a plurality of teeth, a keeper secured to said channel members for selective engagement with said teeth, and a handle secured to said rack.

References Cited in the file of this patent

UNITED STATES PATENTS

| | | |
|---|---|---|
| 2,001,744 | Patterson | May 21, 1935 |
| 2,851,247 | Hilding | Sept. 9, 1958 |